(12) United States Patent
Richer De Forges et al.

(10) Patent No.: US 9,228,912 B2
(45) Date of Patent: Jan. 5, 2016

(54) SYSTEM FOR REAL-TIME DEFLECTOR MONITORING AND RELATED METHODS

(71) Applicant: CGG SERVICES SA, Massy (FR)

(72) Inventors: Hervé Richer De Forges, Massy (FR); Frederic Simonnot, Paris (FR)

(73) Assignee: CGG SERVICES SA, Massy (FR)

( * ) Notice: Subject to any disclaimer, the term of this patent is extended or adjusted under 35 U.S.C. 154(b) by 91 days.

(21) Appl. No.: 14/093,586

(22) Filed: Dec. 2, 2013

(65) Prior Publication Data

US 2014/0202263 A1   Jul. 24, 2014

(30) Foreign Application Priority Data

Jan. 24, 2013   (FR) ..................... 13 50640

(51) Int. Cl.
| | | |
|---|---|---|
| *G01F 1/38* | (2006.01) | |
| *G01L 5/10* | (2006.01) | |
| *G01V 1/38* | (2006.01) | |
| *G01V 1/36* | (2006.01) | |

(52) U.S. Cl.
   CPC .............. *G01L 5/103* (2013.01); *G01V 1/3817* (2013.01); *G01V 1/364* (2013.01)

(58) Field of Classification Search
   CPC ...... G01L 5/103; G01V 1/3817; G01V 1/364; G01V 1/3808
   USPC ....................... 73/862.391, 862.393, 862.451
   See application file for complete search history.

(56) References Cited

U.S. PATENT DOCUMENTS

| | | |
|---|---|---|
| 4,106,335 A | 8/1978 | Shatto |
| 5,456,122 A | 10/1995 | Hassan et al. |
| 7,203,130 B1 * | 4/2007 | Welker ............................ 367/16 |
| 7,778,109 B2 * | 8/2010 | Storteig et al. .................. 367/16 |
| 8,161,660 B2 * | 4/2012 | Swanson et al. ................ 33/756 |
| 2006/0239117 A1 * | 10/2006 | Singh et al. ..................... 367/20 |
| 2008/0049551 A1 * | 2/2008 | Muyzert et al. ................. 367/24 |
| 2010/0039888 A1 * | 2/2010 | Ozdemir et al. ................ 367/13 |
| 2011/0006096 A1 * | 1/2011 | Barea ............................... 226/8 |

FOREIGN PATENT DOCUMENTS

| | | |
|---|---|---|
| CN | 101244795 A | 8/2008 |
| EP | 2360496 A1 | 8/2011 |
| JP | 2011034199 A | 2/2011 |
| KR | 100725052 B1 | 5/2007 |
| KR | 100825052 B1 | 5/2007 |
| WO | 2012070952 A1 | 5/2012 |

OTHER PUBLICATIONS

Extended European Search Report dated Apr. 28, 2014, in related European Application No. 14152230.0.

* cited by examiner

*Primary Examiner* — Max Noori
(74) *Attorney, Agent, or Firm* — Patent Portfolio Builders PLLC

(57) ABSTRACT

A real time deflector monitoring system related to a deflector used in a seismic survey system is provided. The system includes a bridle block configured to connect the deflector to a first rope. The system further includes sensors embedded in the bridle block and configured to measure strength and direction of a tension in at least one of (A) the first rope and/or (B) one of rig ropes connecting the deflector to the bridle block. The system also includes a motion detector configured to acquire information related to deflector's motion.

20 Claims, 7 Drawing Sheets

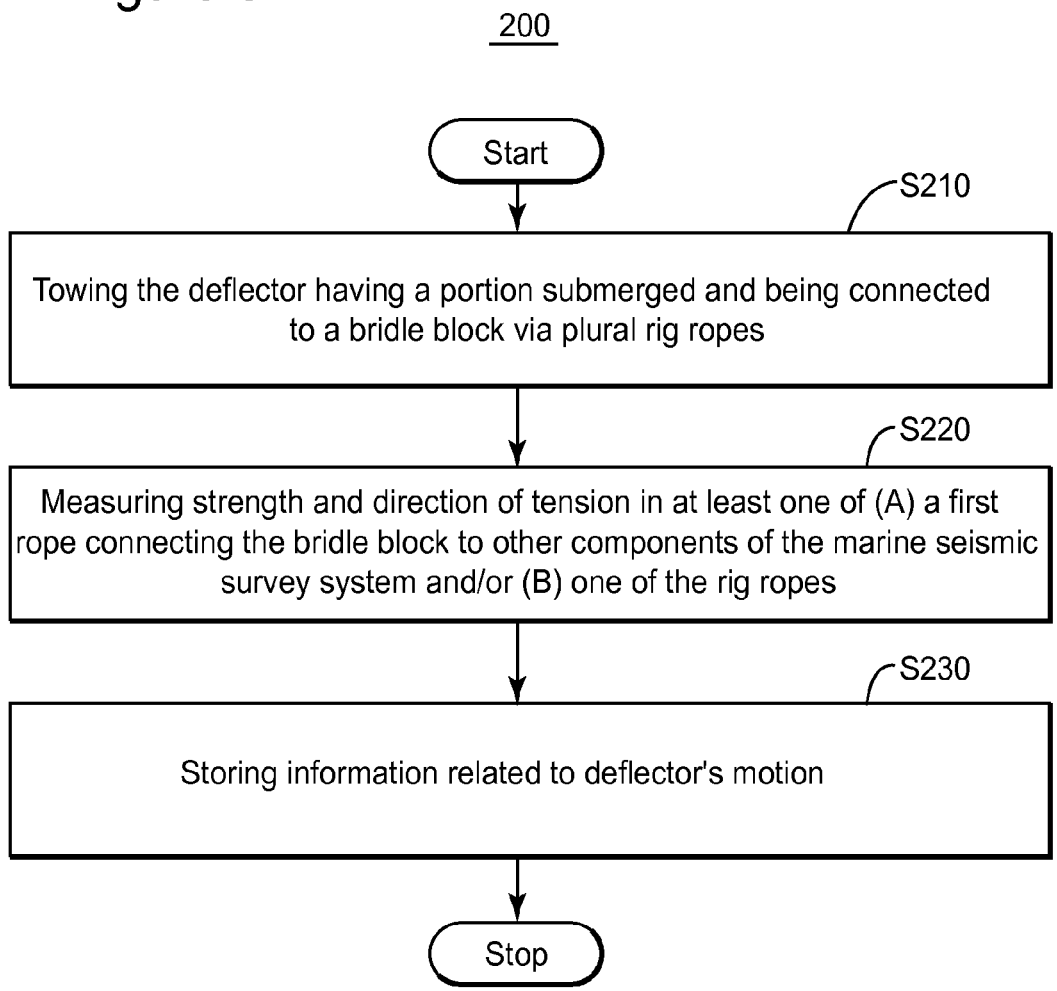

SYSTEM FOR REAL-TIME DEFLECTOR MONITORING AND RELATED METHODS

CROSS-REFERENCE TO RELATED APPLICATION

This application is a continuation of, and claims priority from, French Patent Application No. 1350640, filed on Jan. 24, 2013, the disclosure of which is incorporated here by reference.

BACKGROUND

1. Technical Field

Embodiments of the subject matter disclosed herein generally relate to a marine seismic survey system, more particularly, to monitoring tensions in connecting ropes of a deflector associated with the marine seismic survey system.

2. Discussion of the Background

Marine seismic survey systems are used to explore the geophysical structure under the seafloor. This kind of exploration does not provide an accurate location for oil and gas reservoirs, but may suggest the presence or absence thereof to those trained in the field. Providing a high-resolution image of structures under the seafloor is an ongoing process.

Marine seismic surveys are usually conducted using a seismic vessel towing one or more seismic sources and a number of parallel streamers with detectors, such as hydrophones or geophones. In order to assemble the seismic data gathered by the detectors in a subsurface image, it is desirable to acquire and maintain a known geometry of the towed survey system (i.e., source, streamers, etc.), while seismic data is acquired. One of the devices employed to achieve and maintain the system's geometry is a deflector, which has an active portion towed underwater and is connected via ropes to other components of the survey system (e.g., the vessel, the source, the streamers, etc.).

For example, FIG. 1 shows a marine seismic survey system 10 that includes a vessel 11 towing streamers 20 carrying detectors 22. The detectors 22 are configured to record information related to seismic waves generated by a seismic source (not shown) and reflected from various structures of the subsurface. The streamers 20 are usually towed parallel at equal or known lateral distances from one another. In order to achieve and maintain this geometry, the streamers 20 are coupled to the vessel 11 via lead-in ropes 14. Note that the term "rope" is used for any type of flexible cord or cable, which may also include one or more electrical or optical conductors.

Further as illustrated in FIG. 1, the marine seismic survey system 10 includes two deflectors 16, each coupled to the vessel 11 and the streamers 20 via tow ropes 18 (also known as "wide tow ropes"). The heads 20A of the streamers 20 may have other ropes 24 in between (known as "spread ropes," only one of these ropes is labeled). Depending on the angle made by the active portion of the deflectors 16 with the towing direction, lateral forces may occur, pulling apart the streamers 20. This angle may be adjusted, for example, by changing the length of the tow ropes 18 (when the deflector is on the deck of the vessel). The tow ropes 18 and the deflectors 16 are usually connected to each other using a bridle block 15.

While the marine survey system 10 is towed, the bridle block 15 is constantly subject to large tensions from being pulled by the ropes, but may also be subject to sudden large tensions due to abrupt changes, making it prone to failure. Conventionally these tensions are estimated based on the tension in the tow rope 18 connecting the bridle block 15 to the vessel 11 which is measurable, for example, at or near the vessel 11. However, this single known tension provides insufficient information on the actual tensions applied to the bridle block 15.

Accordingly, it would be desirable to provide systems and methods that acquire more information relative to the deflector assembly, enabling monitoring of the deflector, a smoother operation and better control thereof.

SUMMARY

According to one exemplary embodiment, there is a real-time deflector monitoring system related to a deflector used in a seismic survey system. The system includes a bridle block configured to connect the deflector to a first rope. The system further includes sensors embedded in the bridle block and configured to measure strength and direction of a tension in at least one of (A) the first rope and/or (B) one of rig ropes connecting the deflector to the bridle block. The system also includes a motion detector configured to acquire information related to a deflector's motion.

According to another exemplary embodiment, there is a deflector assembly usable in a marine seismic survey system which includes a first rope towed by a vessel, and a deflector configured to be at least partially submerged while towed to achieve and maintain a predetermined geometry of the marine seismic survey system. The deflector assembly further includes a bridle block configured to be connected between the deflector and the first rope, and rig ropes connecting the bridle block to the deflector. The deflector assembly also includes sensors embedded in the bridle block and configured to measure the strength and direction of a tension in at least one of (A) the first rope and/or (B) one of the rig ropes.

According to another exemplary embodiment, there is a method for monitoring a deflector of a marine seismic survey system. The method includes towing the deflector having a portion submerged and being connected to a bridle block via plural rig ropes. The method further includes measuring strength and direction of tension in at least one of (A) a first rope connecting the bridle block to other components of the marine seismic survey system and/or (B) one of the rig ropes. The method also includes storing information related to deflector's motion.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 is a flowchart illustrating steps performed by a method for monitoring a deflector of a marine seismic survey system according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a deflector assembly used in a marine survey system. However, the embodiments to be discussed next are not limited to these structures, but may be applied to other structures that use a bridle block to connect one device to the rest of a towed system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
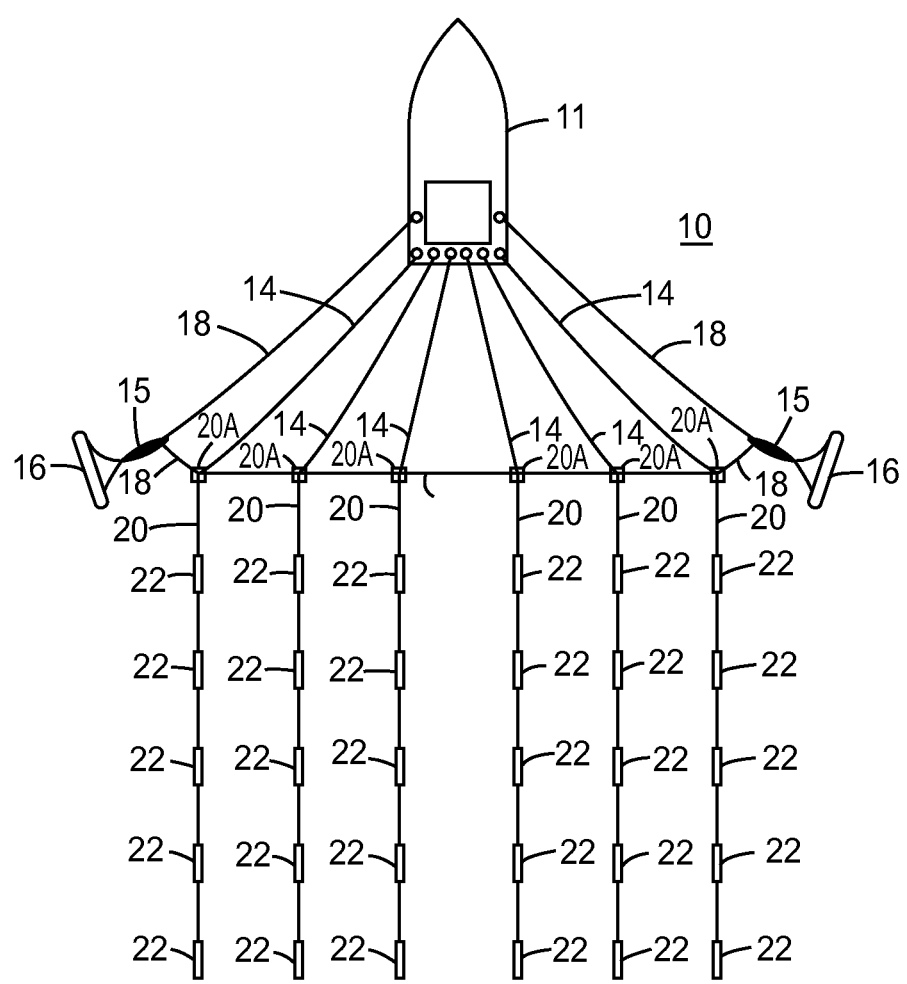
FIG. 1 is a schematic diagram of a marine survey system.
Figure 2:
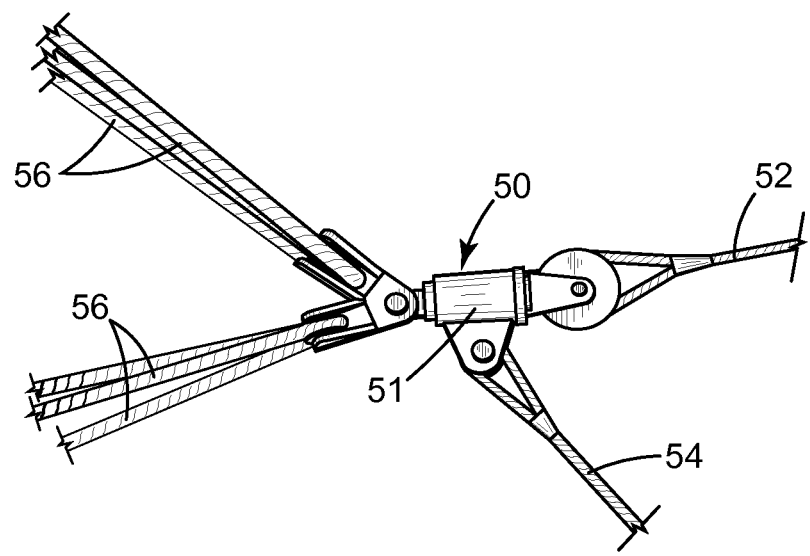
FIG. 2 illustrates a bridle block according to an exemplary embodiment.

FIG. 2 illustrates a bridle block 50 configured to interconnect a tow rope 52 tied to the towing vessel (not shown), a spur rope 54 tied to the heads of the streamers (not shown) and rig ropes 56 (also known as deflector bridle straps) tied to different locations of the active portion of the deflector (not shown). The tow rope 52 and the spur rope 54 are connected to a front part 51 of the bridle block 50. The number and name of the ropes connected to the front end part 51 are merely exemplary and are not intended to be limiting. For example, in another embodiment, a lever arm (i.e., one rope) and a three-eye splice may connect the bridle block to the rest of the marine survey system, e.g., a spur-line and a wide-tow rope. Thus, at least one rope connects the bridle block to the rest of the marine survey system.

According to an exemplary embodiment, sensors configured to measure strength and direction of tension in one or more of the ropes 52, 54, 56 may be embedded in the bridle block 50.

Figure 3:
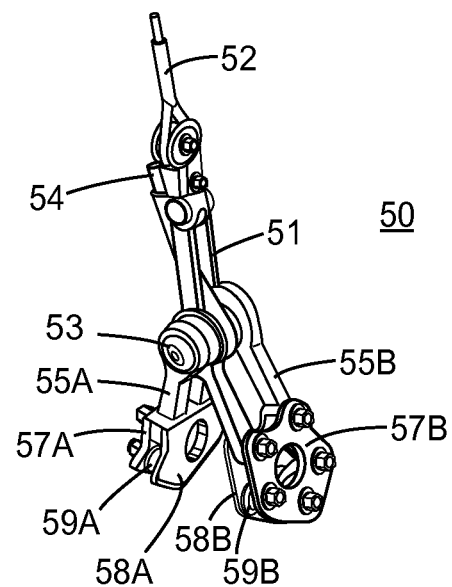
FIG. 3 illustrates detailed features of a bridle block according to an exemplary embodiment.

FIG. 3 illustrates detailed features of the bridle block 50 according to an exemplary embodiment. In this embodiment, the bridle block 50 has two arms 55A and 55B having a common joint 53. Each arm 55A or 55B has three sheaves 59A and 59B, respectively, mounted between two plates 57A and 58A, or 57B and 58B. A rivet passing through the plates and a sheave may be used to mount each sheave, respectively. A portion of the rivet outside the plates may have a helical thread on which a bolt is fitted.

Any of the ropes connecting the bridle block to the deflector or to the rest of the marine survey system may be tied around a sheave. The number and arrangement of the ropes is exemplary and not intended to be limiting. Deflectors are usually connected to the rest of the marine survey system (e.g., to the bridle block) by two rig ropes (e.g., a wide-tow rope and a spur line) to provide stability and maneuvering flexibility. In one embodiment, six rig ropes connect the deflector to the bridle block. The use of the sheave-type connection to tie all the ropes to the bridle block should not be construed as a limitation.

In some embodiments, the sensors configured to measure direction and strength of tension due to a rope pulling may be attached to the sheave. For example, an assembly for one of the ropes connected to the bridle block according to one exemplary embodiment, illustrated in FIG. 4, includes a sheave 59 (illustrated using dashed lines to illustrate the arrangement) mounted under a plate 57. A rope 56 is tied around the sheave 59. A sensor 62 configured to measure the angle of the rope 56 with a reference direction may be embedded in the sheave 59. For example, the sensor 62 may be a magnetic ring encoder. Another sensor 64 may be configured to measure the strength of a tension due to the rope 56. For example, the sensor 64 may be a cell load configured to work in compression when measuring the strength of the tension. Using a cell load is an embodiment preferred to using a traction sensor, because the former avoids the risk of rupture or failure of the assembly in the event of sensor failure.

Figure 5:
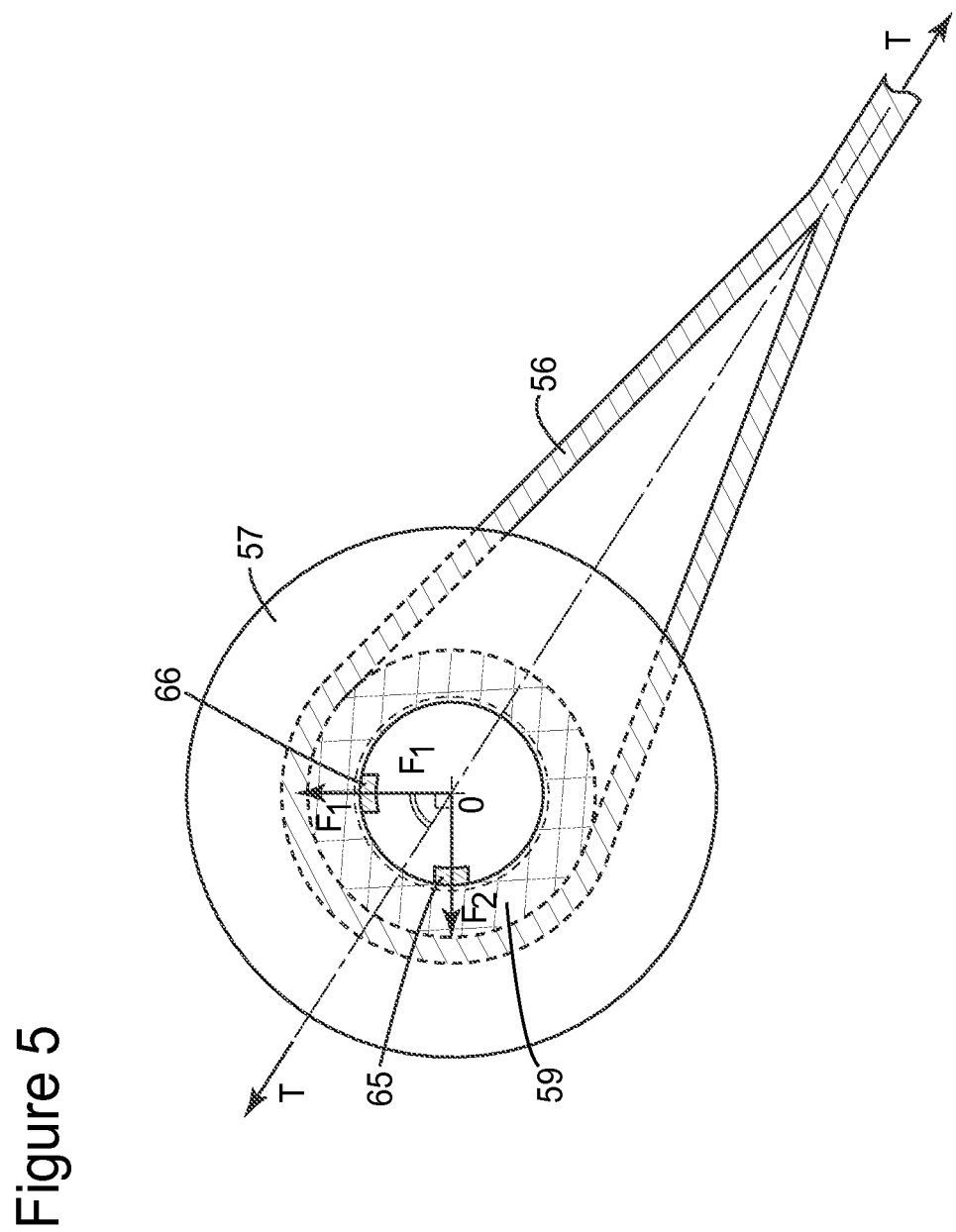
FIG. 5 illustrates an assembly for one of the ropes connected to the bridle block according to another exemplary embodiment.

In another embodiment illustrated in FIG. 5, the strength and the angle of the tension T in the rope are measured using two force sensors 65 and 66 configured to measured rectangular forces $F_1$ and $F_2$. The tension T is the sum of the measured forces $T=F_1+F_2$. The angle of the tension may be calculated using, for example, $\tan(F_1/F_2)$, and the strength (magnitude) is $\text{sqrt}(F_1^2+F_2^2)$.

Figure 6:
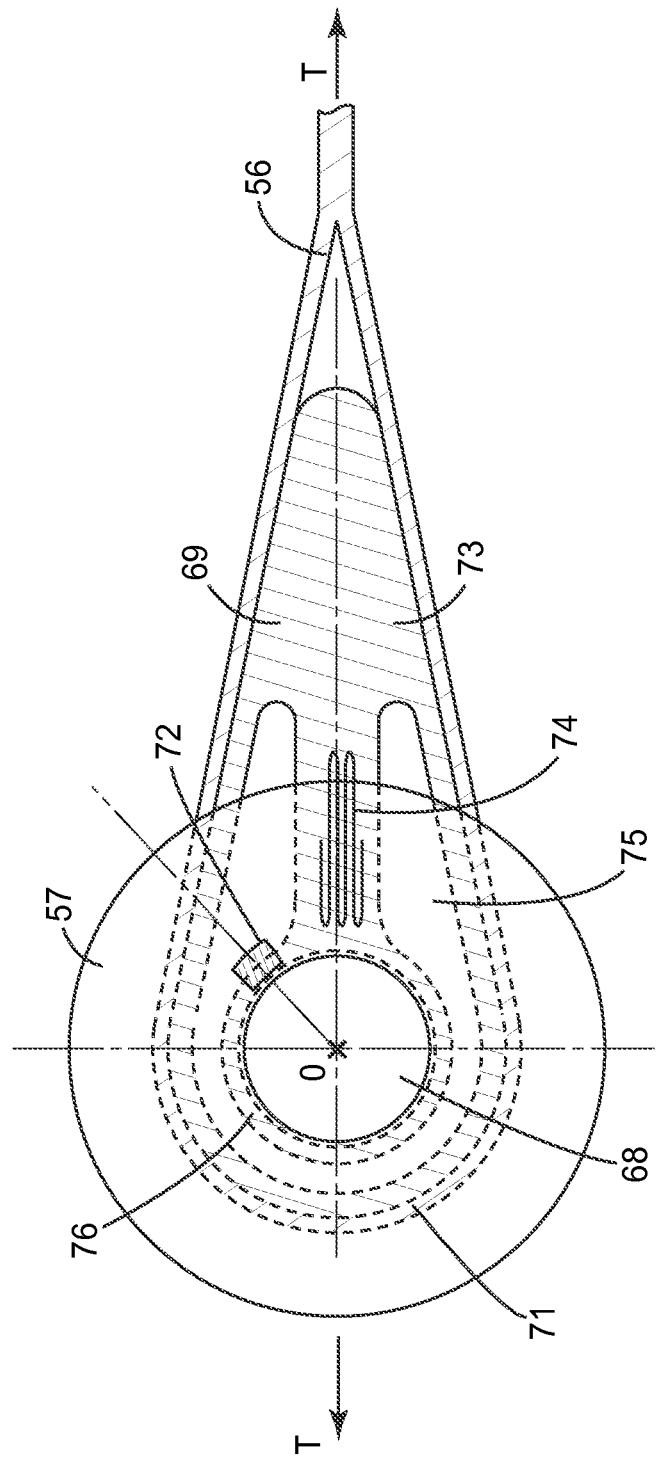
FIG. 6 illustrates an assembly for one of the ropes connected to the bridle block according to another exemplary embodiment.

An assembly for one of the ropes connected to the bridle block according to another embodiment, illustrated in FIG. 6, includes a sheave 69 (illustrated using dashed lines partially to illustrate the arrangement) mounted under the plate 57. A rope 56 is tied around the sheave 69.

Similar to the sheave 59, which has a substantially cylindrical shape (i.e., surrounding at constant distance an axis passing through the center point O), the sheave 69 has an outer shape surrounding the axis passing through the center point O. However, the sheave 69 has a more complex profile, including a first cylindrical-type portion 71, and a second portion 73 extending a greater distance from the axis than the first portion. The outer profile may be ovoid or heart shaped. The sheave 69 is also configured to have a slit 75 between a central area 76 and an outer area thereof, the slit 75 partially surrounding the axis.

A sensor 72 (e.g., a magnetic ring encoder) configured to measure the angle of the rope 56 with a reference direction may be embedded in the sheave 69 (e.g., the central area 76). Due to the sheave's profile, when the rope 56 applies a tension T, the sheave 69 is elastically deformed, extending the central area 76. This deformation may result in a conductivity change, yielding the possibility of measuring the strength of the tension causing the conductivity change using a strain gauge 74.

Figure 4:
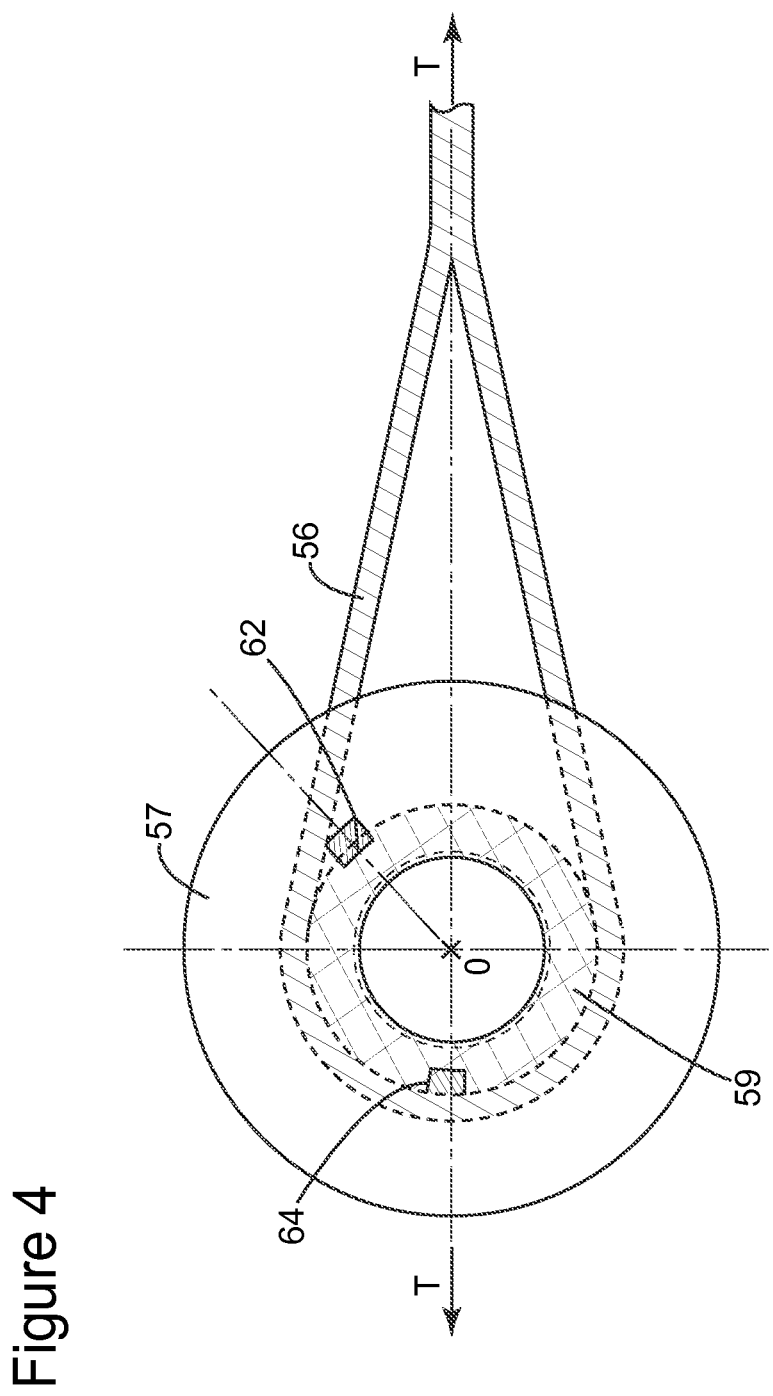
FIG. 4 illustrates an assembly for one of the ropes connected to the bridle block according to one exemplary embodiment.

In FIGS. 4-6, the plate 57 may be any of the plates between which the sheave is mounted. The rope 56 may be any of the rig ropes, the tow rope and the spur rope.

Figure 7:
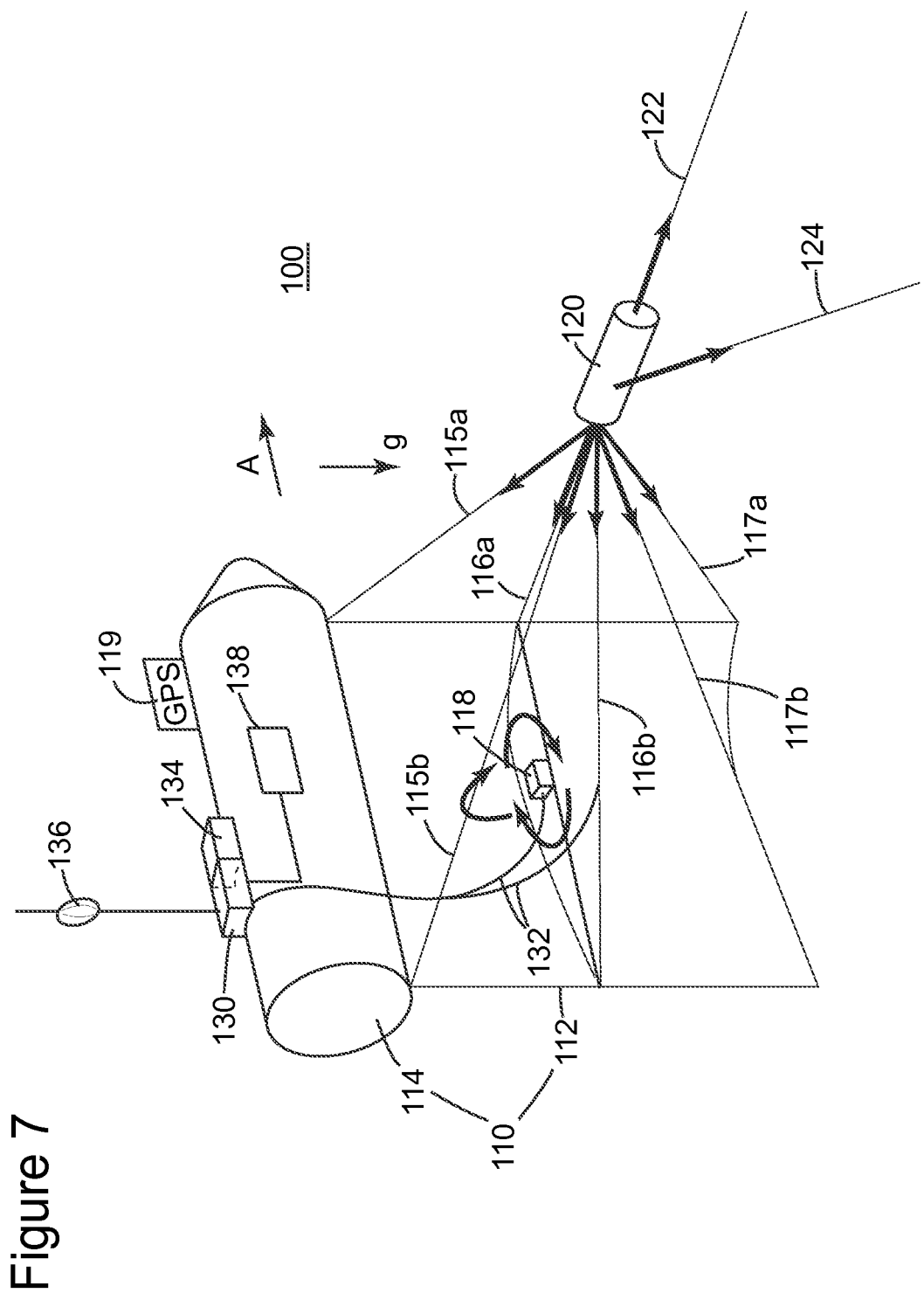
FIG. 7 illustrates a deflector assembly according to an exemplary embodiment.

FIG. 7 illustrates a deflector assembly 100 usable in a marine seismic survey system according to an exemplary embodiment. The deflector 110 includes an active portion 112 that is submerged while towed, and a float 114 that insure the deflector's neutral buoyancy (i.e., that the deflector floats). The bridle block 120 connects the deflector 110 to the rest of the marine seismic survey system (i.e., other components thereof). For example, a tow rope 122 may connect the bridle block 120 to a towing vessel, and a spur rope 124 may connect the bridle block 120 to streamers.

In FIG. 6, the deflector 110 is connected to the bridle block 120 via six rig ropes: rig ropes 115a and 115b are connected to an upper part of the active portion 112, rig ropes 116a and 116b are connected to a middle part of the active portion 112, and rig ropes 117a and 117b are connected to a lower part of the active portion 112. Here, upper and lower are defined relative to gravity as the deflector 110 is towed. The rig ropes 115a, 116a, and 117a are connected to a front edge of the active portion 112, and rig ropes 115b, 116b, and 117b are connected to a trailing edge of the active portion 112. Here, front edge and trailing edge are defined relative to the towing direction indicated by the arrow A. The strength and direction of one or more tensions applied to the bridle block 120 due to the ropes may be measured as discussed above relative to the embodiments in FIGS. 4-6.

A sensor 118 may be provided inside or attached to the active portion 112 of the deflector 110. The sensor 118 may be a 3D position sensor, and may be placed substantially in the middle of the portion 112. However, the sensor 118 may be merely a depth sensor, the 3D position of the deflector 110 being obtained by combining the depth with the information provided by a 2D (e.g., at the water surface) positioning device 119. The 2D positioning device 119 may be a GPS device mounted on the float 114.

The one or more sensors embedded in the bridle block 120, sensor 118 and sensor 119 may transmit the data to a data acquisition unit 130 mounted on the float 114. The sensor(s) embedded in the bridle block 120 may transmit data corresponding to the measured strength(s) and direction(s) of the tension(s) to the float via a wire included in one of the rig ropes, e.g., rig rope 116b in FIG. 7. The data from these sensors and from the sensor 118 may then be transmitted to the data acquisition unit via wires 132. The GPS device 119 may transmit information to the data acquisition unit 130 via wire or wirelessly.

The data acquisition unit 130 may be provided with a power supply 134. In one embodiment, the power supply may be a solar cell, while in another embodiment the power supply may be a battery. The data acquisition unit 130 may also be connected to a radio antenna 136, and may be configured to transmit the data received from the sensors and the information related to the deflector's motion in real time to a remote central processing unit (not shown) located, for example, on the towing vessel.

In one embodiment, the data acquisition unit 130 may be configured as a monitoring unit sending warnings or alarms to a remote controller when the deflector's operation departs from predetermined conditions (e.g., tension exceeds a predetermined threshold value).

A data storage unit 138 may also be mounted inside the float and configured to store the data corresponding to the measured strength and direction of the tension(s) and/or the information related to the deflector's motion.

In one embodiment all the tensions (their strengths and directions) are monitored in order to study the deflector's operation and develop optimized operation strategies. In another embodiment, fewer sensors may be used to monitor in real time one or more of the tensions. The monitoring may enable adjusting the deflector's motion.

FIG. 8 is a flowchart of a method 200 for monitoring a deflector of a marine seismic survey system. The method 200 includes towing the deflector having a portion submerged and being connected to a bridle block via plural rig ropes at S210. The method 200 further includes measuring strength and direction of tension in at least one of (A) a first rope connecting the bridle block to other components of the marine seismic survey system and/or (B) one of the rig ropes at S220. The method 200 also includes storing information related to the deflector's motion, at S230.

The method 200 may further include transmitting data related to the measured strength and direction of the tension and the information related to the deflector's motion to a monitoring unit (e.g., the data acquisition unit 130 or a remote control unit), and adjusting the deflector's motion by the monitoring unit based on the received data.

The data on the tensions' strength and directions enables developing efficient steering strategies and safe operation of the deflector, for example, by remote control from the vessel.

The disclosed exemplary embodiments provide real-time deflector monitoring systems, deflector assembly and related methods usable in a marine survey system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A real time deflector monitoring system related to a seismic survey system, the system comprising:
    a deflector that is deployed in water;
    a bridle block configured to connect the deflector to a first rope;
    sensors embedded in the bridle block and configured to measure strength and direction of a tension in at least one of (A) the first rope and/or (B) one of rig ropes connecting the deflector to the bridle block; and
    a motion detector located on the deflector and configured to acquire information related to deflector's motion in water.

2. The system of claim 1, wherein
    the bridle block has a sheave, the at least one of (A) the first rope and/or (B) one of the rig ropes in which the sensors measure the tension being tied around the sheave, and
    the sensors include an angular encoder embedded in the sheave and configured to measure the direction of the tension.

3. The system of claim 2, wherein the sheave surrounds an axis and has a first portion at a substantially constant distance from the axis, a second portion extending at a larger distance from the axis than the first portion, and a slit partially surrounding the axis cut between an inner part and an outer part of the sheave.

4. The system of claim 3, wherein the sensors include a strain gauge mounted on the second portion and configured to measure the strength of the tension.

5. The system of claim 1, wherein the information provided by the motion detector includes at least one of a three dimensional position of the deflector and an acceleration of the deflector.

6. The system of claim 1, wherein
the deflector includes a float and an active portion configured to be submerged while the deflector is towed, and
the motion detector includes a depth sensor mounted inside the active portion, and a GPS device mounted on the float.

7. The system of claim 1, wherein the deflector includes a float, and the system further comprises:
a radio transmitter mounted on the float and configured to transmit data corresponding to the measured strength and direction of the tension, and the information related to the deflector's motion.

8. The system of claim 7, wherein the sensors transmit data corresponding to the measured strength and direction of the tension to the float via a wire included in one of the rig ropes.

9. The system of claim 1, wherein the deflector includes a float, and the system further comprises:
a data storage unit configured to store data corresponding to the measured strength and direction of the tension and/or the information.

10. The system of claim 1, further comprising:
a control system configured to adjust a motion of the deflector based on the measured strength and direction of the tension and/or the information related to the deflector's motion.

11. A deflector assembly useable in a marine seismic survey system, the deflector assembly comprising:
a first rope towed by a vessel;
a deflector configured to be at least partially submerged while towed to achieve and maintain a predetermined geometry of the marine seismic survey system;
a bridle block configured to be connected between the deflector and the first rope;
rig ropes connecting the bridle block to the deflector; and
sensors embedded in the bridle block and configured to measure strength and direction of a tension in at least one of (A) the first rope and/or (B) one of the rig ropes.

12. The deflector assembly of claim 11, wherein
the bridle block has a sheave, the at least one of (A) the first rope and/or (B) one of the rig ropes for which the sensors measure the tension being tied around the sheave,
the sensors include an angular encoder attached to the sheave and configured to measure the direction of the tension, and
the deflector includes a motion detector configured to acquire information related to the deflector's motion in water.

13. The deflector assembly of claim 12, wherein the sheave surrounds an axis and has a first portion at a substantially constant distance from the axis, a second portion extending at a larger distance from the axis than the first portion, and a slit partially surrounding the axis cut between an inner part and an outer part of the sheave.

14. The deflector assembly of claim 13, wherein the sensors include a strain gauge mounted on the second portion and configured to measure the strength of the tension.

15. The deflector assembly of claim 12, wherein the information provided by the motion detector includes at least one of a three dimensional position of the deflector and an acceleration of the deflector.

16. The deflector assembly of claim 12, wherein
the deflector includes a float and an active portion configured to be submerged while the deflector is towed, and
the motion detector includes a depth sensor mounted inside the active portion, and a GPS device mounted on the float.

17. The deflector assembly of claim 12, wherein the deflector includes a float, and
the system further comprises at least one of
a radio transmitter mounted on the float and configured to transmit data corresponding to the measured strength and direction of the tension, and/or the information related to the deflector's motion; and
a data storage unit configured to store data corresponding to the measured strength and direction of the tension and/or the information.

18. The deflector assembly of claim 17, wherein the sensors transmit data corresponding to the measured strength and direction of the tension to the float via a wire included in one of the rig ropes.

19. A method for monitoring a deflector of a marine seismic survey system, the method comprising:
towing the deflector having a portion submerged and being connected to a bridle block via plural rig ropes;
measuring strength and direction of tension in at least one of (A) a first rope connecting the bridle block to other components of the marine seismic survey system and/or (B) one of the rig ropes; and
storing information related to deflector's motion.

20. The method of claim 19, further comprising:
transmitting data related to the measured strength and direction of the tension and the information to a monitoring unit; and
adjusting the deflector's motion by the monitoring unit based on the received data.

* * * * *